United States Defensive Publication [19] (H) [11] T983,002

Coney et al. [43] Jun. 5, 1979

[54] DIELECTRIC COATING COMPOSITIONS AND RECORDING SHEETS MADE THEREFROM

[76] Inventors: Charles H. Coney, 2008 Canterbury Rd.; Don R. Leonard, Rte. 15, 421 Old Castle Rd., both of Kingsport, Tenn. 37660

[21] Appl. No.: 951,425

[22] Filed: Oct. 16, 1978

Related U.S. Application Data

[63] Continuation of Ser. No. 850,163, Nov. 10, 1977, abandoned.

[51] Int. Cl.[2] ..... B32B 9/06; C08L 1/12

[52] U.S. Cl. ..... 428/498; 106/173 R

[57] ABSTRACT

Coating compositions useful as a dielectric layer for electrostatic recording sheet material are disclosed. The compositions comprise cellulose acetate butyrate having a butyryl content of from about 47 to about 55%, an acetyl content of from about 0.5 to about 15%, a hydroxyl content of from 0 to about 1.0% and a viscosity of from about 0.2 to about 20 seconds. Preferably, the composition includes an ester prepared from gum, wood and/or tall oil rosin at an amount of up to about 70% based on the combined weight of the cellulose ester and rosin ester.

8 Claims, No Sheets Drawing,

18 Pages Specification

The file of this unexamined application may be inspected and copies thereof may be purchased (849 O.G. 1221, Apr. 9, 1968).